May 23, 1961 W. S. BERTAUX ET AL 2,984,970
THRUST AUGMENTING SYSTEM
Filed July 31, 1956 2 Sheets-Sheet 1

INVENTORS.
MILTON H. SHACKELFORD
HANS BOLLENBACHER
BY WALTER S. BERTAUX

John F. Cullen
THEIR ATTORNEY

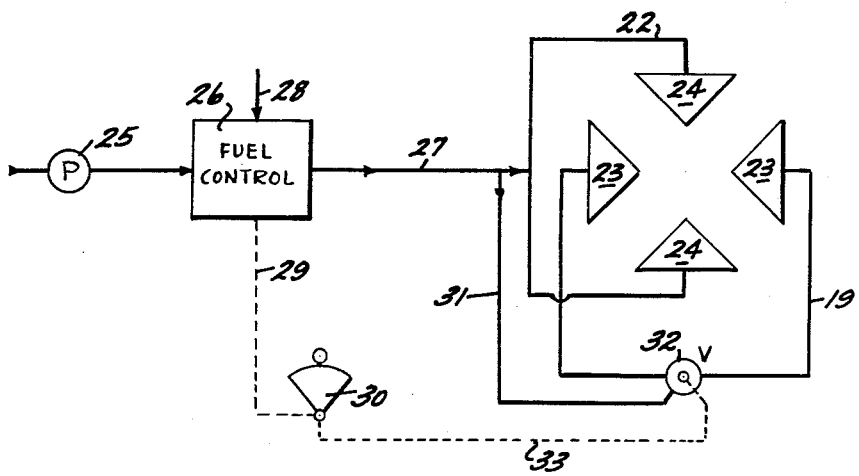
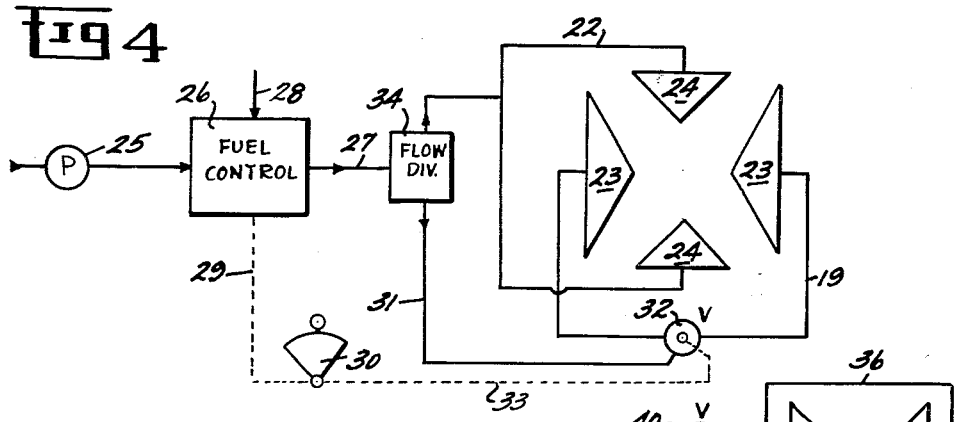
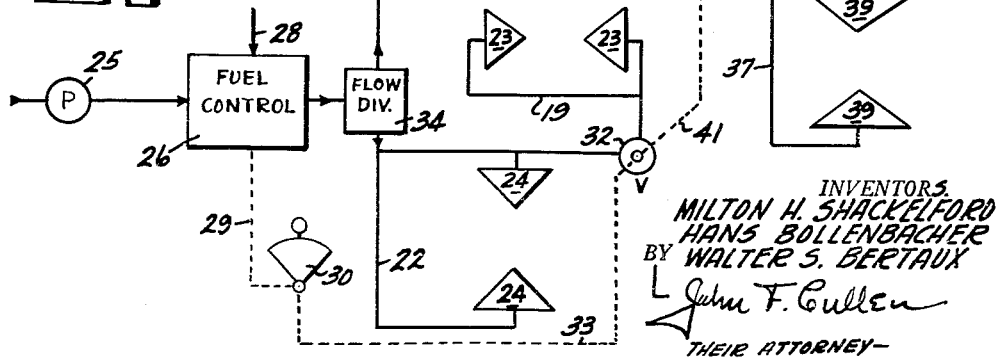

United States Patent Office 2,984,970
Patented May 23, 1961

2,984,970

THRUST AUGMENTING SYSTEM

Walter Stanley Bertaux and Hans Bollenbacher, Cincinnati, Ohio, and Milton Howard Shackelford, Cedar Grove, N.J., assignors to General Electric Company, a corporation of New York Filed July 31, 1956, Ser. No. 601,307

1 Claim. (Cl. 60—35.6)

The present invention relates to a thrust augmenting system for jet engines and, more particularly, to a system for achieving thrust modulation of a gas turbine afterburner over a wide range of operation.

It is common practice with jet engines, at least for military applications, to employ the use of an afterburner for increased thrust to meet certain demands. With such engines, an additional tailpipe structure is provided which is called the afterburner. The normal exhaust gases from the non-afterburner or "dry" engine are passed through the afterburner tailpipe where additional fuel is injected resulting in further expansion of the gases and increased thrust from the engine. When the afterburner is in operation, the engine is said to be operating on reheat and, during this period, large quantities of fuel are injected into and burned in the afterburner. Consequently, it is important that combustion in the afterburner be efficient if the augmentation system is to be economical and practical. If the reheat fuel were suddenly turned on and "dumped" into the afterburner, then to give maximum combustion efficiency, the thrust increase from the dry engine operation would be approximately 30% or higher. In other words, if the afterburner were turned on under these conditions, there would be a sudden burst of speed due to the higher thrust available and the temperature and stresses would rise very rapidly. It will be apparent that these conditions are undesirable for obvious reasons. For example, if a plane were trying to refuel in the air and needed additional thrust to be obtained from reheat operation, the sudden burst of speed would make the refueling maneuver practically impossible. Consequently, the sudden thrust increase during switch-over from dry to reheat operation must be avoided.

To avoid this sudden thrust increase, it has been common practice to inject the fuel into the afterburner in gradually increasing amounts and various arrangements have been devised to accomplish this. Some systems use concentric ring manifolds in which the fuel is injected generally sequentially from the inner to the outer ring. Difficulty is encountered with this system including the vaporization of the fuel within the rings due to the temperature to which the rings are exposed. Other systems employ individual nozzles or fuel injectors which are activated in some predetermined fashion to gradually increase the amount of fuel injected and provide a gradual rise in the thrust. Difficulties are encountered in maintaining the proper fuel-air ratio to give satisfactory ignition throughout the range of operation.

The primary object of the present invention is to disclose a thrust augmentation system which will deliver the necessary fuel to the afterburner in the most judicious manner possible consistent with engine structural standards.

Another object is to disclose a high performance combustion system which will provide the necessary thrust modulation of the afterburner over a wide range of operation.

A further object is to disclose such a system that will yield a minimum thrust increase at light-off of the afterburner.

A further object is to provide a system that will maintain the proper fuel-air ratio in the burning areas that will not have an over-rich mixture during switch-over from local to uniform burning and will provide sufficient fuel at the switch-over point to support stable combustion during uniform or complete burning in the afterburner.

Briefly stated, in accordance with one aspect of our invention, we provide a thrust augmentation system which utilizes sector or pie-shaped fuel injection and burning at the switch-over from dry to reheat operation. The sector burning is obtained by a system including manifolding and individual spray bars generally radially directed into the tailpipe whereby, at switch-over burning is initiated in sectors. As the burning continues and the fuel flow increases, the sectors may be gradually widened by additional fuel from neighboring spray bars until, at full reheat, all the spray bars are in operation to provide complete and uniform burning in the afterburner.

Our invention will be better understood from the following description taken in connection with the accompanying drawings, and its scope will be pointed out in the appended claim.

In the drawings:

Figure 3 is a schematic showing of the augmentation system employing quadrant sector injection;

Figure 4 is a view similar to Figure 3 of a system employing sector injection and;

Figure 5 is a schematic showing of a modified system employing multiple sector injection in accordance with the invention.

Figure 1:
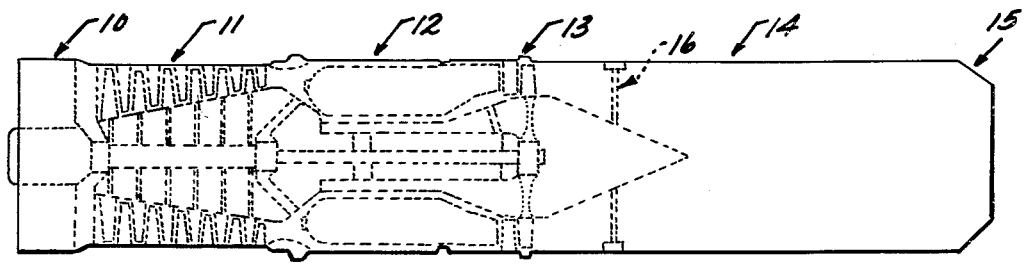
Figure 1 is a diagrammatic showing of a typical jet engine employing the instant invention.

Referring first to Figure 1, there is shown a typical turbojet engine that may employ the instant invention and in which 10 is the inlet to the engine, 11 is the compressor section which may be of the axial flow type as shown, 12 is the combustor section which may be either annular or cannular, 13 is the turbine section, 14 is the tailpipe or afterburner section which may be provided with a suitable nozzle at 15. The additional fuel for reheat or afterburner operation is normally injected downstream of the turbine in the instant invention by a suitable spray bar assembly 16 which will generally be arranged in a plane substantially transversely to the tailpipe 14.

Figure 2:
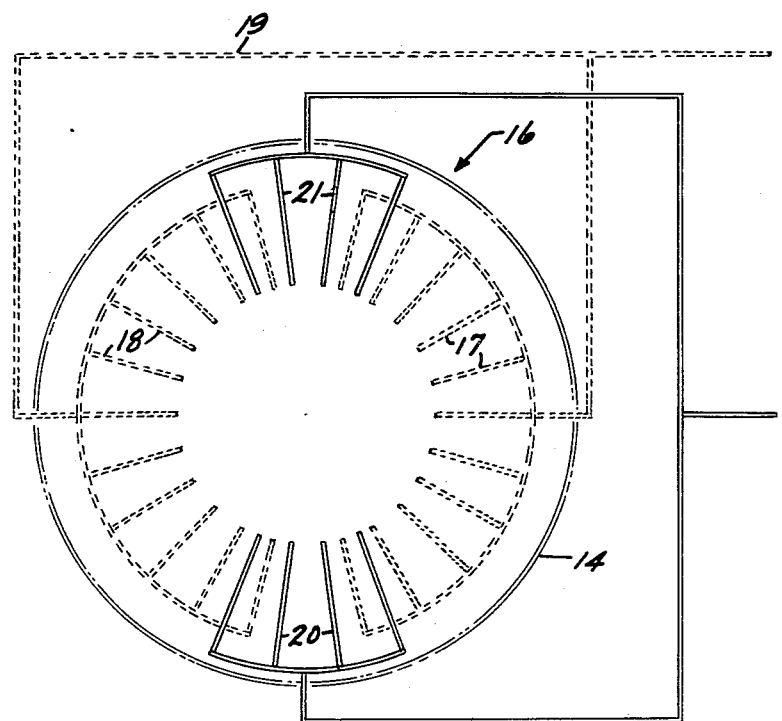
Figure 2 is a diagrammatic view of a typical spray bar assembly of the type employed in the invention.

In order to inject the fuel in the sector pattern desired, spray bar assembly 16 may be arranged as shown diagrammatically in Figure 2. The spray bar assembly will normally conform to the cross sectional configuration of tailpipe 14 and may be circular as shown in Figure 2. It comprises a series of individual spray bars 17 in one sector connected to a similar series of spray bars 18 in another sector by a common manifold 19. The sectors encompassed by spray bars 17 and 18 may cover any suitable angular arrangement as determined by the operating characteristics of the engine. In addition, another set of spray bars 20, normally fewer in number, is connected to a similar set of spray bars 21 by a common manifold 22 to form additional sectors separate from the first. Again, the sectors covered by spray bars 20 and 21 may encompass any suitable angular arrangement, including the overlapping of the neighboring sectors as shown. For efficient operation, the sectors comprising groups of spray bars 20 and 21 are preferably diametrically opposed. It is to be understood that, while only two manifolds and their connected groups of spray bars have been shown, any suitable number may be employed in any arrangement desired providing the sector injection requirement is complied with as will be pointed out later. Thus far described, fuel entering manifold 22 will be injected from the groups of spray bars 20 and 21 in sector patterns that are diametrically opposed to one another. The invention is designed to admit fuel to groups of spray bars 17 and 18 through manifold 19 after injection has been started through spray bars 20 and 21. Thus, fuel injection is begun in a sector pattern and then spread through the whole tailpipe by the addition of all or part of the remaining area encompassed by spray bars 17 and 18. It will also be apparent that any number of spray bars may be used in the diagrammatic showing of the assembly in Figure 2 and the overlapping or non-overlapping feature may be varied as desired. The proper selection of the initial sector burning that takes place by spray bars 20 and 21 yields the minimum thrust increase at light-off of the afterburner. It is also important that the fuel-air ratio in the sectors defined by spray bars 20 and 21 should not have an over-rich local mixture in those sectors at the switch-over point from the sector to the uniform burning system. By suitable controls that will be described as part of the combination, the present invention solves this problem. With the sector burning system just described, the fuel is injected in the exhaust gas stream in localized sectors to give a combustible mixture and, when ignited, produces a relatively small overall temperature rise and thrust increase in the afterburner.

Referring next to Figure 3, the sector burning arrangement is shown with its associated controls as taught by the invention. In this figure which is intended to be schematic only, the injected fuel pattern as determined by the numbers and the arrangements of the groups of spray bars is schematically shown by triangles 23 and 24 which are intended to illustrate the sector patterns. For example, sectors 24 represent the fuel pattern that is injected by groups of spray bars 20 and 21 connected to manifold 22 and sectors 23 represent the fuel pattern that is injected by spray bars 17 and 18 connected to manifold 19 and omitting the overlapping arrangement shown in Figure 2. As can be seen in Figure 3, the sectors are shown as quadrants of the cross section of the tailpipe 14. Also, it will be apparent that the diametrically opposed sectors or quadrants are connected to common manifolds. Fuel is supplied from a suitable conventional source through a fuel pump 25 to fuel control mechanism 26. Fuel control 26 may take many forms depending upon the engine and consists merely of a mechanism which is designed to receive various engine parameters or signals, interpret these signals, and schedule the proper quantity of fuel through line 27 to a point of use which, in the instant case, is to manifolds 19 and 22. Fuel control 26 may have few or many signals directed to it, two of which will typically be the compressor discharge pressure which enters at line 28 and the throttle setting which enters through control line 29 as determined by the position of throttle means 30. Light-off of the afterburner in sectors 24 may take place manually or automatically by means of throttle 30 transmitting a suitable signal through control line 29 to the fuel control in a conventional manner. Thus, at light-off, fuel is injected through the spray bars in sectors 24 as determined by the fuel control 26. This initial sector injection in sectors 24 ensures the proper fuel-air ratio in those sectors for ignition and provides the maximum combustion efficiency and minimum thrust increase at light-off. Fuel control 26 also supplies fuel to line 31 which carries fuel to manifold 19. In order to avoid the injection of fuel in sectors 23, a fuel selector valve 32 is interposed between manifold 19 and fuel control 26. Thus, valve 32 controls the flow of fuel in sectors 23. The position of valve 32 is determined by control line 33 connected to throttle 30 so that at higher throttle settings a signal is communicated through line 33 to valve 32 to activate the valve and permit fuel injection in sectors 23. It will be apparent that the signal to valve 32 may be transmitted automatically by the throttle 30 through line 33 or it may be transmitted by a separate manual switch disconnected from throttle 30. The advantage of the former arrangement is that the pilot need not worry when to actuate valve 32 since his throttle 30 may be made to do it automatically by any suitable mechanism such as tripping a switch in the upper regions of the throttle setting.

In operation of the arrangement shown in Figure 3, fuel is first scheduled by the fuel control through sectors 24 to provide fuel injection in sector patterns. Normally this light-off of the afterburner by fuel injection through sectors 24 will take place at a constant fuel flow. As the fuel flow increases from fuel control 26 as determined by the engine parameters including the positions for setting of throttle 30 to activate valve 32, additional sectors 23 will inject fuel to provide for uniform or complete burning throughout the tailpipe combustion area.

Referring next to Figure 4 wherein like numerals apply to similar parts, there is shown a schematic drawing of a slightly modified arrangement. In this arrangement, the sectors 23 and 24 are shown as covering different angles of the cross sectional area of the tailpipe, wherein the spray bars determining sectors 23 overlap those of sectors 24. The advantage of this arrangement is to provide for a wider dispersal of injected fuel than that shown in Figure 3. In addition, a pressure responsive flow dividing valve 34 is provided between the fuel control and the manifolds and divides the fuel to the individual manifolds in any predetermined pattern as called for by valve 34. Valve 34 may be any conventional pressure responsive flow dividing valve which is set in any selected manner to divide the flow proportionately between the manifolds. In other words, valve 34 may send fuel to the manifolds 22 and 19 in the ratio of 2:1 or in any other desired ratio, depending on the selection of valve 34. In addition, flow divider 34, being a pressure responsive device, may change or reverse the ratio with a change in flow to the flow divider. Thus, in normal operation as the fuel flow is increased through the flow divider, the flow divider then schedules a greater proportion of the fuel to sectors 23 than is received by sectors 24. This avoids an over-rich fuel-air ratio in sectors 24 as they approach a stoichiometric mixture with increased fuel flow. The operation of the arrangement shown in Figure 4 is essentially the same as that shown in Figure 3 with the exception of the aforementioned different sector pattern and the different quantities of flow to the individual manifolds as determined by valve 34.

Referring next to Figure 5, there is shown a schematic arrangement employing the principle of sector injection as described for Figures 3 and 4 and including more sector arrangements to illustrate the versatility of the present invention. Like numerals refer to similar parts in Figure 5. The arrangement shown in this figure employs additional secondary injection of fuel for a wider range of fuel modulation during reheat operation. As previously described, sectors 24 are activated in the light-off position as determined by throttle 30 followed at increased fuel flow by complete or uniform injection through sectors 23 as activated by the selector valve 32 as signaled by throttle 30. In addition, flow divider 34 may direct fuel to an additional or secondary system through line 35 to manifolds 36 and 37 which connect groups of spray bars to inject fuel in sector patterns 38 and 39, respectively. An additional fuel selector valve 40, which may be mechanically connected by linkage 41 to valve 32, determines the fuel injection in sectors 38 under control of throttle 30. It is to be noted that the sectors in each or in both systems may overlap each other to any desired extent. Thus, sectors 38 and 23, 24 and 39, 23 and 24, and 38 and 39 may all overlap if desired. The fuel to each system is determined by flow divider 34 which normally will increase the fuel to line 35 with an increase in fuel flow sensed by valve 34 sending a proportionately larger amount of fuel to line 35 at increased fuel flow. In operation, fuel will intially be injected through sectors 24 and as these sectors reach a fuel-air ratio that approaches stoichiometric flow divider 34 may schedule fuel through line 35 to sectors 39 which, as shown, will peripherally widen sectors 24 reducing the fuel to the latter by the proportional division determined by valve 34 in response to increased fuel flow. Thus, sectors 24 are widened by the addition of sectors 39 to avoid an over-rich fuel-air ratio as the flow is increased. In a similar manner, when valves 32 and 40 are activated by throttle 30 in the upper throttle region, fuel is scheduled to sectors 23 and 38 in the proportion called for by valve 34 with sectors 38 receiving a larger proportion of the fuel with increased flow which, as shown, will widen sectors 23 and provide for complete and uniform distribution of the fuel in the tailpipe.

The use of the system described in Figure 5, wherein a primary and secondary system are provided as described above, provides a minimum and a maximum fuel flow as demanded by the systems. In other words, for certain applications a minimum and maximum fuel flow are required for efficient combustion and the two system arrangement provides more versatility in obtaining the flows that may be required. For example, the orifice area for the spray bars may be calculated for the minimum fuel flow required by the engine and the spray bars constructed in accordance with this area. Using the same area with the maximum pressure supplied by the pump, it is possible to calculate the maximum fuel flow. If this maximum fuel flow is not enough to supply the maximum fuel required by the engine, the system will be inadequate. By providing an additional or secondary system, as described in Figure 5, it is possible to provide both the maximum and the minimum fuel flows required by the engine. It will be apparent that the arrangement described in Figure 5 may be compounded to provide for an even wider range of sector injection even going to tertiary injection if necessary.

From the above description, it can be seen that we have provided an augmentation system which utilizes a novel sector injection pattern to provide the necessary thrust modulation of the afterburner or tailpipe over a wide range of operation, high combustion efficiency, and a minimum thrust increase in the light-off position.

While particular embodiments of the invention have been illustrated and described, it will be obvious to those skilled in the art that various changes and modifications may be made without departing from the invention, and it is intended to cover in the appended claim all such changes and modifications that come within the true spirit and scope of the invention.

What we claim as new and desire to secure by Letters Patent is:

A thrust augmenting system for jet engines including an afterburner tailpipe structure defining a combustion zone and a fuel injecting spray bar assembly disposed in the tailpipe; said spray bar assembly comprising: pairs of oppositely directed groups of spray bars positioned in the tailpipe to deliver fuel to sectors of the tailpipe cross-section to form locally combustible fuel-air mixtures in those sectors, each group of one pair being arranged to inject fuel over considerably narrower sectors of the tailpipe cross-section than the adjacent groups; at least two manifolds, each connected to a pair of oppositely directed groups of spray bars; throttle-responsive fuel control means connected to the manifolds for metering fuel flow thereto; a flow divider connected to the manifolds downstream of the control means for proportioning the fuel between the manifolds; and a throttle-responsive fuel selector valve connected to the manifolds to restrict fuel to said one pair of groups of spray bars at low fuel flow rates.

References Cited in the file of this patent

UNITED STATES PATENTS

| | | |
|---|---|---|
| 2,508,420 | Redding | May 23, 1950 |
| 2,763,126 | Halford | Sept. 18, 1956 |
| 2,780,915 | Karen | Feb. 12, 1957 |
| 2,818,703 | Victor | Jan. 7, 1958 |